United States Patent
Lewis et al.

(10) Patent No.: US 7,648,047 B2
(45) Date of Patent: Jan. 19, 2010

(54) ROTARY SCREW ESCAPEMENT DEVICE AND METHODS OF USE THEREOF

(75) Inventors: Karl Lewis, Chico, CA (US); Gary Hubbard, Chico, CA (US)

(73) Assignee: Norfield Industries, Chico, CA (US)

( * ) Notice: Subject to any disclaimer, the term of this patent is extended or adjusted under 35 U.S.C. 154(b) by 506 days.

(21) Appl. No.: 11/679,770

(22) Filed: Feb. 27, 2007

(65) Prior Publication Data

US 2007/0209910 A1    Sep. 13, 2007

Related U.S. Application Data

(60) Provisional application No. 60/777,464, filed on Feb. 27, 2006.

(51) Int. Cl.
*B65H 3/00* (2006.01)
(52) U.S. Cl. ................. 221/196; 221/231; 221/234; 221/296; 221/294
(58) Field of Classification Search ............ 198/757; 227/112; 221/157, 156, 165, 178, 182, 196, 221/231, 234, 252, 256, 257, 263, 265, 277, 221/278, 296, 294, 312 B
See application file for complete search history.

(56) References Cited

U.S. PATENT DOCUMENTS

| | | | | |
|---|---|---|---|---|
| 3,526,743 A | * | 9/1970 | Spisak | 221/68 |
| 3,930,808 A | * | 1/1976 | Miller et al. | 29/809 |
| 5,425,473 A | * | 6/1995 | Kvalheim | 221/188 |
| 5,480,087 A | * | 1/1996 | Young et al. | 221/268 |

* cited by examiner

*Primary Examiner*—Gene Crawford
*Assistant Examiner*—Timothy R Waggoner
(74) *Attorney, Agent, or Firm*—Townsend and Townsend and Crew LLP; Gerald T. Gray

(57) ABSTRACT

Apparatus that receives multiple screws serially from a vibrating bowl with a single exit ramp, collects a plurality, e.g., six, of screws and distributes the plurality of screws simultaneously to different tubes in one assembly. A rotary holder having a plurality of notches for receiving and holding screws, receives the screws serially from a feeder rail coupled to a vibrating screw feed bowl. After the notches have filled with screws, the screws are released into a corresponding plurality of exit tubes, where the screws may be fed (e.g., by air pressure) to a screw applicator device coupled to a distal end of the exit tubes.

14 Claims, 6 Drawing Sheets

ROTARY SCREW ESCAPEMENT DEVICE AND METHODS OF USE THEREOF

CROSS-REFERENCES TO RELATED APPLICATIONS

This application claims the benefit of U.S. Provisional Patent Application 60/777,464 entitled ROTARY SCREW ESCAPEMENT DEVICE AND METHODS OF USE THEREOF, by Karl Lewis et al., filed Feb. 27, 2006, the entire contents of which are incorporated herein by reference.

FIELD OF THE INVENTION

The present application relates generally to automatic fed screwdrivers and more particularly to a rotary screw escapement device and uses thereof in automatic fed screwdriver systems.

BACKGROUND

A common practice in manufacturing is to assemble products using automatic fed screwdrivers. In some instances, multiple screws need to be installed simultaneously. The current method is to escape the screws one at a time and transport each screw to a switching assembly that sorts the screws into separate tubes. This method is slow and expensive.

Accordingly, there is a need for improved screw escapement devices and systems that avoid the problems associated with prior systems.

BRIEF SUMMARY

The present invention provides an apparatus that receives multiple screws serially from a vibrating bowl with a single exit ramp, collects a plurality, e.g., six, of screws and distributes the plurality of screws simultaneously to different tubes in one assembly. A rotary holder having a plurality of notches for receiving and holding screws, receives the screws serially from a feeder rail coupled to a vibrating screw feed bowl. After the notches have filled with screws, the screws are released into a corresponding plurality of exit tubes, where the screws may be fed (e.g., by air pressure) to a screw applicator device coupled to a distal end of the exit tubes.

According to one aspect of the invention, a rotary screw escapement device is provided that typically includes a housing having a plurality of exit ports and a screw feed port for receiving screws one at a time, and a rotary screw holding mechanism including a rotary holder having a plurality of notches, each notch for holding a screw. In typical operation, the screws are delivered to the rotary holding mechanism via the feed port one at a time, and the rotary screw holder rotates to receive a screw in each of the plurality of notches, and the holding mechanism is configured to release the held screws into each of the plurality of exit ports simultaneously. In certain aspects, the device includes a first feedback sensor for detecting whether a notch in the holder is holding a screw, and a second feedback sensor to detect when the screws in the rotary holder and exit tubes are aligned or to create a desired alignment between the holder and the exit tubes.

According to another aspect of the invention, a screw escapement system is provided that typically includes a screw feed bowl, and a screw escapement device having a rotary screw holding mechanism contained within a housing, the mechanism including a drop plate and a rotary holder coupled to a stepper motor, the rotary holder having a plurality of notches, each notch for holding a screw, the housing having a plurality of exit ports and a screw feed port for receiving screws one at a time. The system further typically includes a slide rail assembly coupling an output port of the feed bowl with the screw feed port of the housing, wherein the slide rail assembly provides screws to the housing serially, a plurality of exit tubes coupled to the exit ports at a proximal end and to a screw application device at a distal end thereof, and a control system that controls operation of the feed bowl, the stepper motor and the screw escapement device. In a typical operation of the system, screws are delivered from the feed bowl by the slide rail assembly to the feed port serially, and the rotary screw holder rotates to receive a screw in each of the plurality of notches, and the holding mechanism is controlled to release the held screws into each of the plurality of exit ports simultaneously when all notches are holding a screw.

According to yet another aspect of the invention, a method is provided for providing a plurality of screws to a screw application device. The method typically includes receiving a plurality of screws serially at a screw feed port of a rotary escapement device including a rotary holder having a plurality of notches, each notch for holding a screw, filling each of the notches by controllably rotating the rotary holder until all notches hold a screw; and thereafter releasing the held screws into each of a plurality of exit ports simultaneously. In certain aspects, the method also typically includes, thereafter, providing air pressure to the exit ports so as to simultaneously propel the screws in each of the exit tubes to an applicator device at a distal end of the tubes.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1:
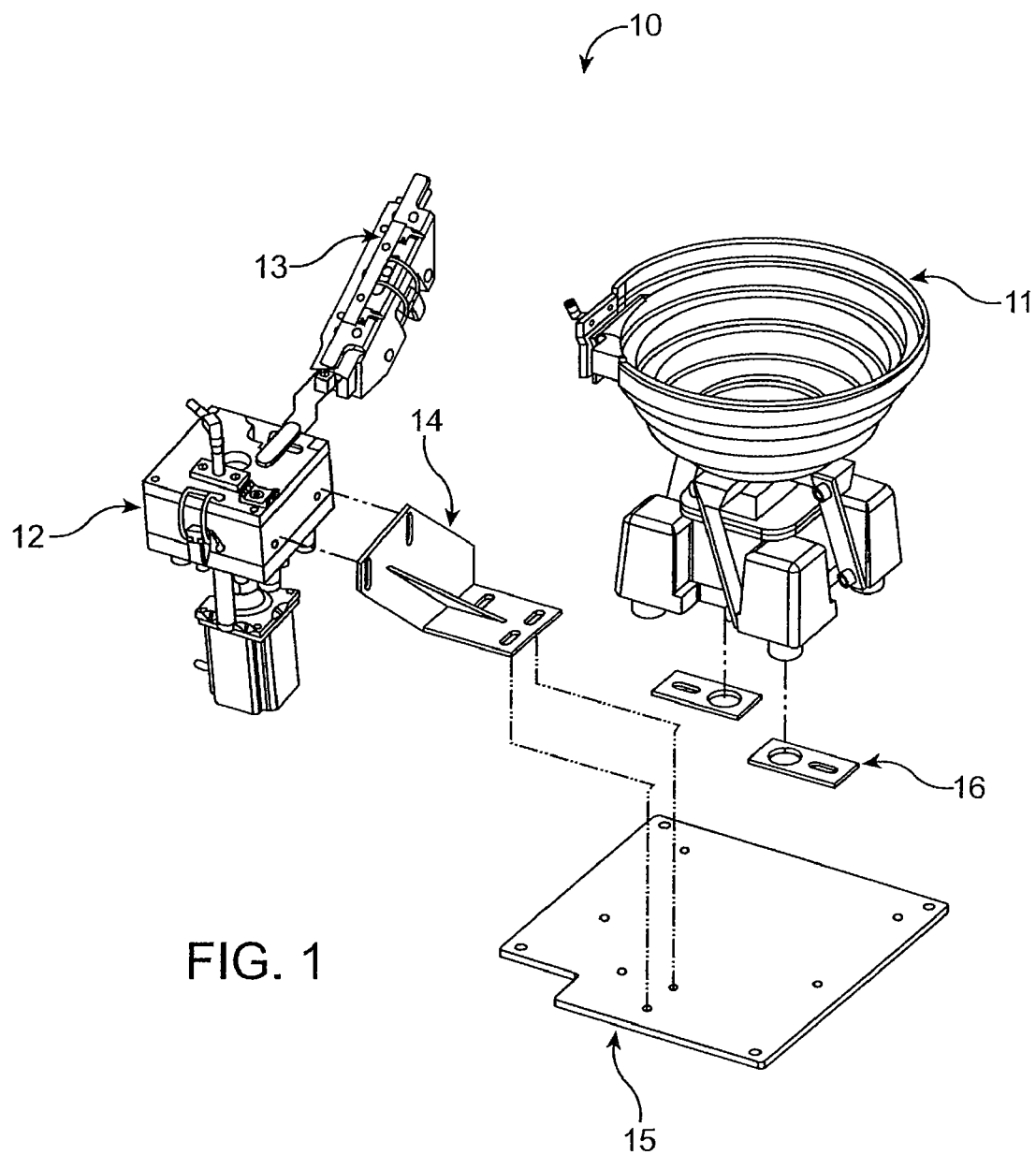
FIG. 1 illustrates a view of a bowl and feeder apparatus according to one embodiment.

FIG. 1 illustrates a view of a bowl and feeder apparatus 10 according to one embodiment. Apparatus 10 includes a screwfeeder escapement assembly 12 that receives screws (not shown) from a feeder bowl 11 via a slide rail assembly 13 that mates with an output port of feeder bowl 11 and with an input slot, port or mechanism of escapement assembly 12 to deliver screws from bowl 11 to assembly 12 as will be described in more detail below. A mount 14 is provided to secure escapement assembly 12 to a base plate 15 or other fixed surface. As shown in FIG. 5, for example, escapement assembly 12 may be mounted to a base plate on a cart assembly, or directly to the cart assembly. Bowl foot retainer mounts 16 are provided to facilitate mounting feeder bowl assembly to base plate 15 or other fixed surface. Escapement assembly 12 includes a main body with an entry slot and exit holes for the screws. The entry slot is fed by slide rail assembly 13 which includes an inclined set of feed rails that support the screws, e.g., by their heads.

Figure 2:
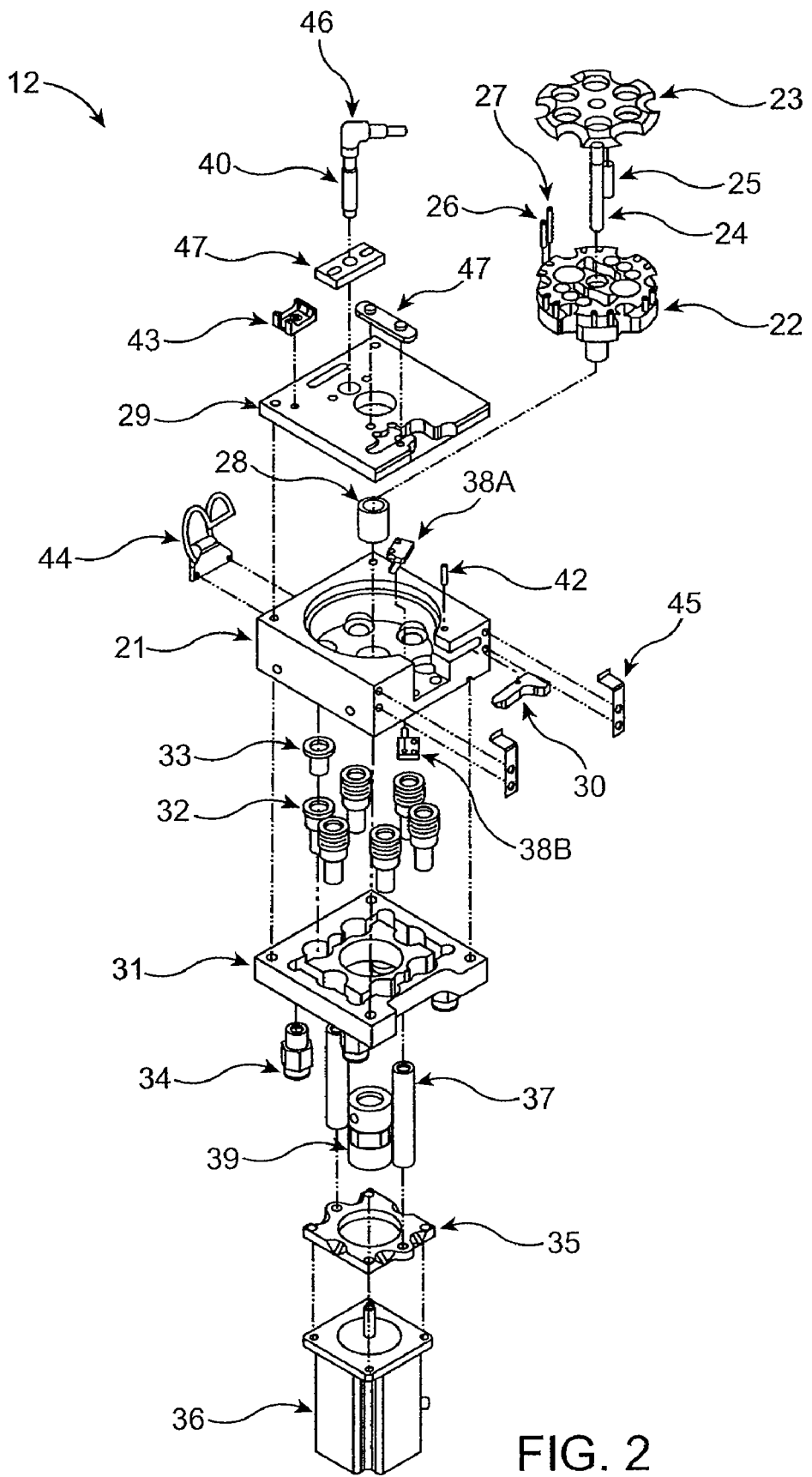
FIG. 2 is an exploded view of a rotary screw escapement device according to one embodiment.

FIG. 2 is an exploded view of a rotary screw escapement assembly 12 according to one embodiment. The main body of assembly 12 is generally defined by screw feeder manifold 21, cover 29 and exit flange 31. Screw feeder manifold 21 includes exit holes adapted to mate with exit tubes 32. Optional exit tube inserts 33 are provided to facilitate air flow functionality. In the main body, a rotary screw holder 22 rotates on a one way clutch 28. Rotary screw holder 22 includes a plurality of notches for receiving and holding screws from the feed rail assembly 13. In one aspect, notches are arranged symmetrically around the periphery of holder 22; 6 notches are shown, but it should be appreciated that fewer or more notches may be provided. A drop plate 23 drives the rotary screw holder 22. In certain aspects, the drop plate is biased, e.g., spring loaded, to the rotary screw holder 22. Drop plate 23 is driven by stepper motor 36 via drop plate shaft 24 and shaft coupler 39. A motor mount plate 35 covers motor 36 and allows for coupling motor mount standoff bars 37 to exit flange 31 (i.e., bottom portion of the main body).

In the main body, a screw rejection tab or lever 30 is provided at the entry slot. Cams in the rotary screw holder 22 operate the screw rejection lever 30. In one aspect, exit flange 31 operates as an air injection manifold that allows air to be injected into the exit tubes 32 to force the screws down the tubes.

When in operation, the feed rails are filled by a vibrating bowl (not shown). During operation of the apparatus, the vibratory hopper bowl is energized so as to cause the screws to be serially delivered into the slot of the slide rail assembly ("feed rail") 13. The screws in the feed rail 13 use gravity to provide a positive pressure against the rotary screw holder.

The motor 36 rotates the rotary screw holder 22 and the drop plate 23. When a notch in the rotary screw holder 22 lines up with the entry slot in the main body, a screw falls into the notch and is swept to the side by the drop plate 23. When the screw has cleared the tip of the screw rejection lever 30, the cam in the rotary screw holder 22 pushes the screw rejection lever 30 out. The screw rejection lever 30 pushes the row of screws in the feed rails up the incline and releases the pressure from the rotary screw holder 22.

There is now a screw in a notch in the rotary screw holder 22. The screw head is supported by the rotary screw holder 22 on one side and by the drop plate 23 on the other. The rotary screw holder 22, and drop plate 23, continue to rotate until all of the notches have screws in them. As above, in one aspect, 6 notches are provided, however, a holder 22 may be configured with a plurality, e.g., two or more, of notches. One or more photoswitch sensor pairs (e.g., emitter and detector pair 38A and 38B as shown) are included in one aspect to provide feedback signals to the control system (as will be discussed in more detail below) as to whether a notch in a certain position is holding a screw. The sensor pair(s) provide error detection capability to the control system to allow the control system to take corrective action. For example, where a slot is determined to be empty, a control system may activate the rotary holding mechanism (e.g., via stepper motor 36) to step through a screw collection cycle to ensure that each notch is filled with a screw prior to initiating release of the held screws into the exit tubes.

The rotary screw holder 22 is then aligned with the exit holes (and exit tubes 32) in the main body. The drop plate 23 is powered in the opposite direction. Because the rotary screw holder 22 operates in one aspect on a one way clutch, it stays in alignment with the exit holes. In one aspect, only the drop plate 23 rotates in the reverse direction and the screws are allowed to drop through the exit holes.

The rotary screw holder 22 then rotates sufficiently to close the exit hole but not far enough to line up with the entry slot, and air pressure is applied to the air injection manifold and the screws are delivered to the feeder hoses connected to the exit tubes 32. In certain aspects, pressurized air is provided to "shoot" the screws down the exit tubes 32 and the feeder hoses connected thereto. Air pressure is provided from a pressure source to the exit flange 31, and screw feeder manifold 21 through one or more (e.g., four) hoses connected to one or more (e.g., four) threaded hose connectors 34.

Figure 3:
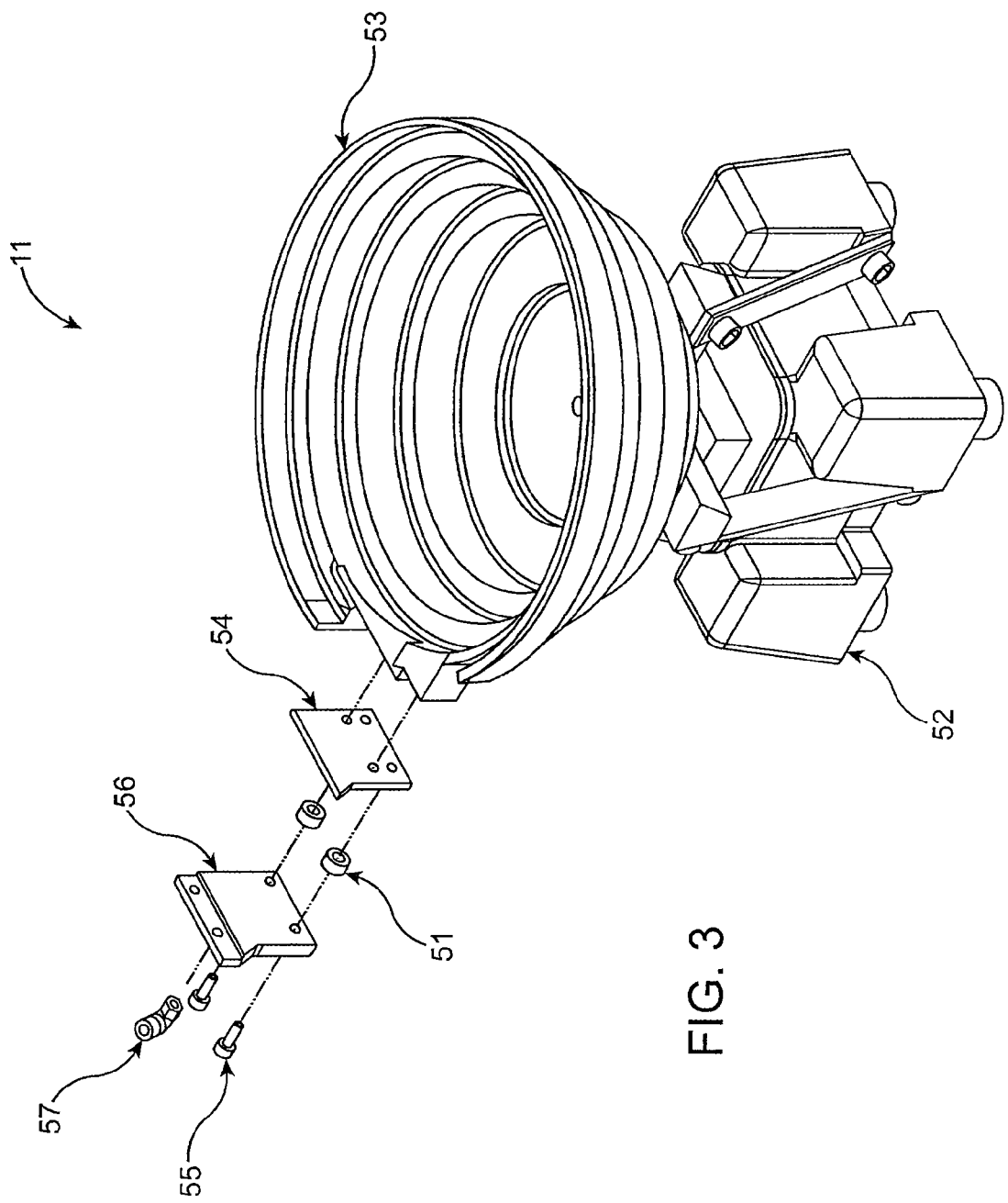
FIG. 3 is an exploded view of a portion of the feeder bowl assembly according to one embodiment.

FIG. 3 is an exploded view of a portion of the feeder bowl assembly 11 according to one embodiment. Bowl 11 includes a vibrating hopper bowl 53 with base unit 52 of conventional design. At an upper portion as shown, a pair of slide rails 54 and 56 define an exit chute that mates with an entry port of slide rail assembly 13. An air fitting 57 is provided for coupling to a pressurized air source, e.g., to reject screws that do not properly enter slide rail assembly 13.

Figure 4:
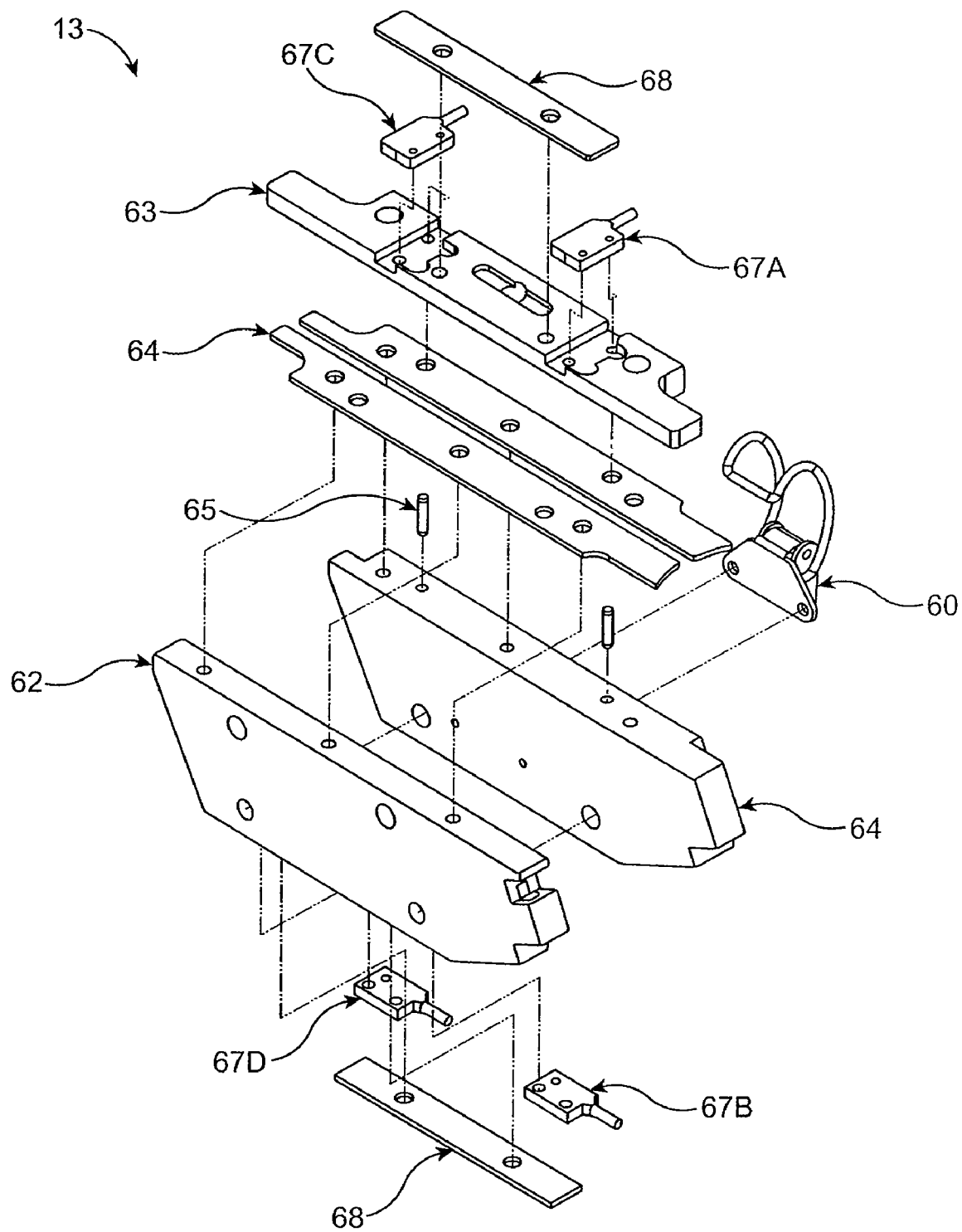
FIG. 4 is an exploded view of a slide rail assembly according to one embodiment.

FIG. 4 is an exploded view of a slide rail assembly 13 according to one embodiment. As can be seen in FIG. 1, the slide rail assembly 13 defines a delivery chute that is inclined downwardly, and is composed of a base plate 63 and two side support plates 62 and 64 (and a wear strip 64) which are laterally spaced apart so as to define a slot therebetween for slidably receiving and delivering a line of the screws. The slot is sized for receiving the shanks of the threaded screws, and the upper surface of the wear strip support the heads of the descending screws. In one aspect, a toggle latch 66 is provided to facilitate removal and replacement of the slide cover 63 to allow access to the screws, e.g., to allow for manual cleaning of stuck screws. One or more optional photoswitch sensor pairs (e.g., emitter and detector pair 67A and 67B and emitter and detector pair 67C and 67D as shown) are included to provide feedback signals to the control system as to position and feed rate of screws in slide rail assembly 13. In one aspect, the control system may shut down the feeder system (bowl and slider) if the slider is determined to be full. The sensors may include optical sensors, e.g., a light emitter and a light sensor, or other sensors, including, for example, proximity sensors.

In one embodiment, a control system is provided to automatically control operation of the various system components, e.g., feeder bowl 11, stepper motor 36, air pressure generators, etc. The control system, in certain aspects, receives feedback signals from the various system sensors, e.g., sensors 38 of escapement assembly 12 and sensors 67 of slide rail assembly 13. The control system, in certain aspects, includes a programmable logic circuit (PLC) and/or dedicated computer system that interfaces with and controls the various system components, and which, in certain aspects, provides a user interface to an operator, e.g., via one or more buttons, knobs or switches and/or via a GUI screen on a monitor or separate computer (e.g., networked or directly coupled computer).

In one embodiment, the control system controls the various system components to provide a continuous feed operation. In a first cycle, screws are fed into the holder 22 until all notches are filled. In a second cycle, the held screws are released into the corresponding exit tubes. In a next cycle, pressurized air is provided to "shoot" the screws down the exit tubes to the applicator device at a distal end of the tubes or hoses connected to the tubes. During this cycle, screws are also loaded into the notches of the holder 22. In a next cycle, the screws that were provided to the applicator device are used (e.g., applied to hinges with a screw applicator as is well known) and the newly held screws in holder 22 are dropped or released into the exit tube. In a next cycle, air pressure is again provided to force the screws down the tubes, and more screws are loaded into the holder 22. This operation can continue on as desired. At any time a fault is detected, e.g., screw missing from notch, screw stuck within holder 22, etc. the control system can notify an operator with an error message and/or take corrective action.

Figure 5A:
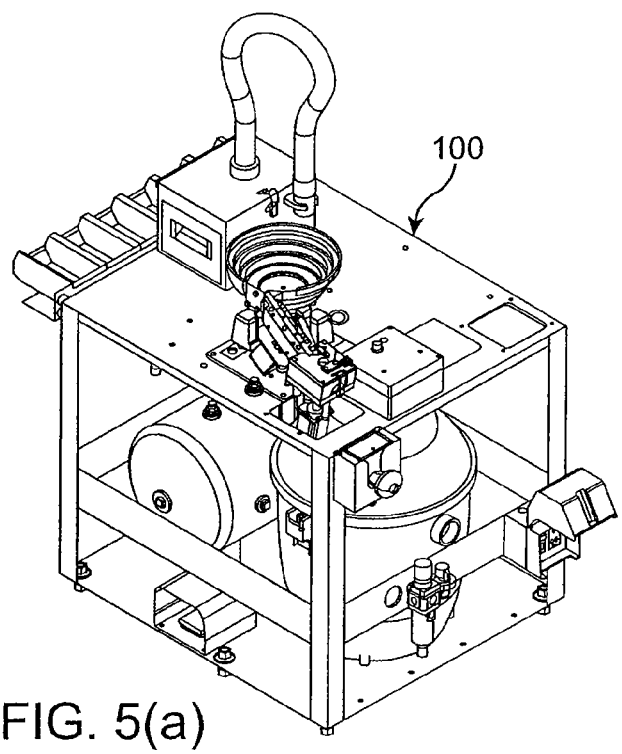
FIG. 5(a) illustrates the assembly of FIG. 1 mounted on a cart.
Figure 5B:
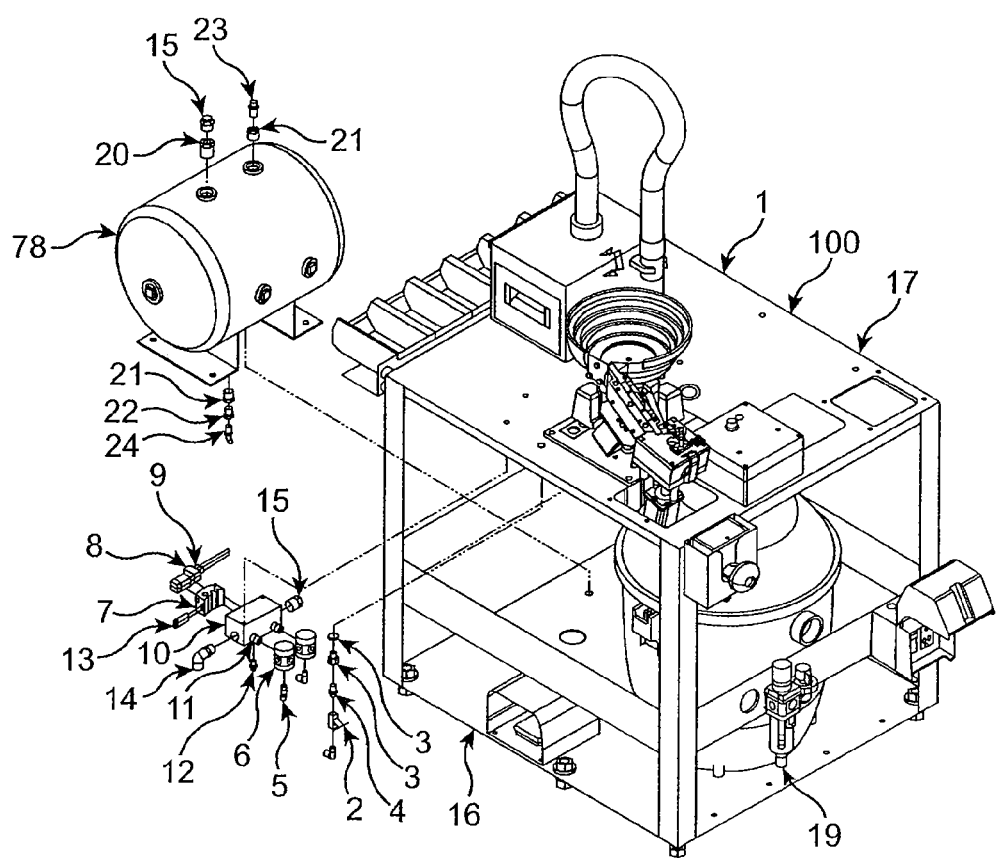
FIG. 5(b) shows an exploded view of portions of FIG. 5(a).

FIG. 5(a) illustrates the assembly of FIG. 1 mounted on a cart; FIG. 5(b) shows an exploded view of portions of FIG. 5(a). As shown, an air pressure system, e.g., accumulator, 76 is provided on cart 100 as well as associated components (e.g., valves, manifolds, tubing, etc.) for providing pressurized air, power supply ports and other equipment as may be desired.

Figure 6:
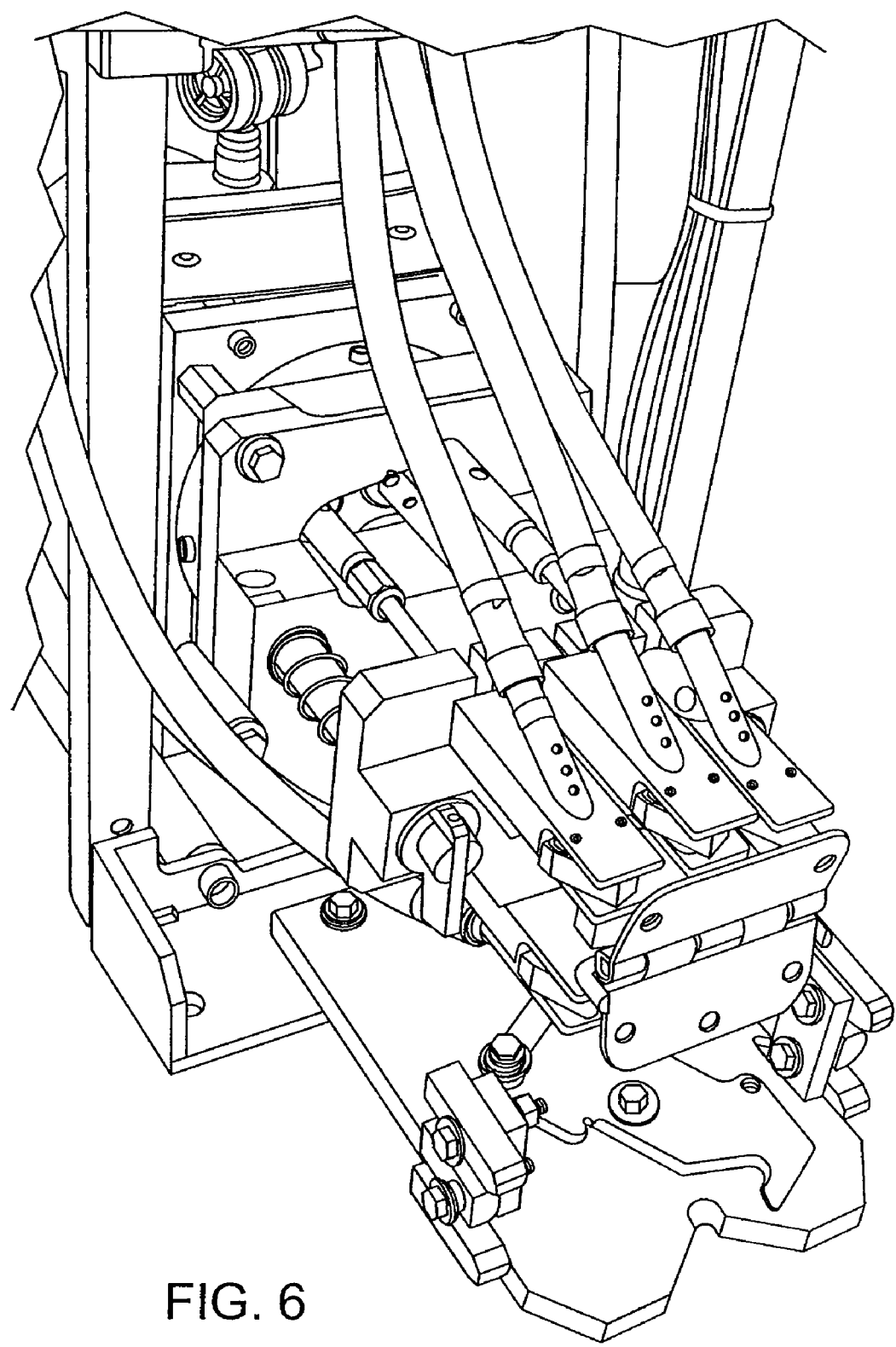
FIG. 6 illustrates the ends of a plurality of feeder hose lines attached to an applicator assembly according to one embodiment.

FIG. 6 illustrates the ends of a plurality of feeder hose lines attached to an applicator assembly according to one embodiment. As can be seen, a six screw hinge is positioned proximal to the applicator apparatus. Screws are delivered to the applicator apparatus in each tube simultaneously. In this embodiment, there are six notches in the holder 22 to hold six screws for simultaneous provision to the exit tubes 32 and thereafter to the applicator device. It should be appreciated that other embodiments may include fewer or greater notches, and corresponding number of exit tubes, e.g., 8, 4. In general, anywhere from two up to ten or more notches may be provided on a holder 22.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A rotary screw escapement device, comprising:
    a housing having a plurality of exit ports and a screw feed port for receiving screws one at a time; and
    a rotary screw holding mechanism including a rotary holder having a plurality of notches, each notch for holding a screw; and
    wherein the screws are delivered to the rotary holding mechanism via the feed port one at a time, and wherein the rotary screw holder rotates to receive a screw in each of the plurality of notches, and wherein the holding mechanism is configured to release the held screws into each of the plurality of exit ports simultaneously.

2. The rotary screw escapement device of claim 1, further comprising:
    a drop plate; and
    a stepper motor configured to drive the rotary screw holder and the drop plate.

3. The rotary screw escapement device of claim 2, further including a stepper motor coupled to a drop plate, wherein the drop plate is biased to the rotary holder and is configured to rotate in both directions, and wherein the rotary holder is mounted on a one way clutch and only rotates in one direction.

4. The rotary screw escapement device of claim 1, further including a tab, which when activated allows a single screw to enter the rotary holder and prevents other screws from entering, wherein cams on the rotary holder activate the tab.

5. The rotary screw escapement device of claim 1, further including a slide rail assembly coupled to the feed port for providing screws to the feed port one at a time.

6. The rotary screw escapement device of claim 1, further including a plurality of exit tubes coupled to the plurality of exit ports.

7. The rotary screw escapement device of claim 6, further including a plurality of tubing lines, coupled to the plurality of exit tubes, for delivering the screws to an application device at a distal end thereof.

8. The rotary screw escapement device of claim 1, further including:
    a first feedback sensor for detecting whether a notch in the holder is holding a screw; and
    a second feedback sensor to detect when the screws in the rotary holder and exit tubes are aligned.

9. The rotary screw escapement device of claim 1, wherein said plurality of notches consists of six notches.

10. A screw escapement system, comprising:
    a screw feed bowl;
    a screw escapement device having a rotary screw holding mechanism contained within a housing, the mechanism including a drop plate and a rotary holder coupled to a stepper motor, the rotary holder having a plurality of notches, each notch for holding a screw, said housing having a plurality of exit ports and a screw feed port for receiving screws one at a time;
    a slide rail assembly coupling an output port of the feed bowl with the screw feed port of the housing, wherein the slide rail assembly provides screws to the housing serially;
    a plurality of exit tubes coupled to the exit ports at a proximal end and to a screw application device at a distal end thereof; and
    a control system that controls operation of the feed bowl, the stepper motor and the screw escapement device;
    wherein screws are delivered from the feed bowl by the slide rail assembly to the feed port serially, and wherein the rotary screw holder rotates to receive a screw in each of the plurality of notches, and wherein the holding mechanism is controlled to release the held screws into each of the plurality of exit ports simultaneously when all notches are holding a screw.

11. The system of claim 10, wherein the screw escapement device includes a first feedback sensor that provides feedback signals to the control system as to whether a notch in the holder is holding a screw, and a second feedback sensor for device alignment.

12. The system of claim 10, further including an air pressure system configured to provide pressurized air to the screw escapement device in response to a control signal from the control system, wherein said pressurized air forces the plurality of released screws in the exit tubes to said distal end.

13. A method of providing a plurality of screws to a screw application device, the method comprising:
    receiving a plurality of screws serially at a screw feed port of a rotary escapement device including a rotary holder having a plurality of notches, each notch for holding a screw;
    filling each of said notches by controllably rotating the rotary holder until all notches hold a screw; and thereafter
    releasing the held screws into each of a plurality of exit ports simultaneously; and thereafter
    providing air pressure to the exit ports so as to simultaneously propel the screws in each of the exit tubes to an applicator device at a distal end of the tubes.

14. The method of claim 13, wherein said plurality of notches consists of six notches and wherein the plurality of exit tubes consists of six exit tubes.

* * * * *